Jan. 29, 1957 F. G. WEIS 2,779,562
WEIGHING TANK SWITCH CONTROL SYSTEM
Filed Aug. 29, 1955 2 Sheets-Sheet 1
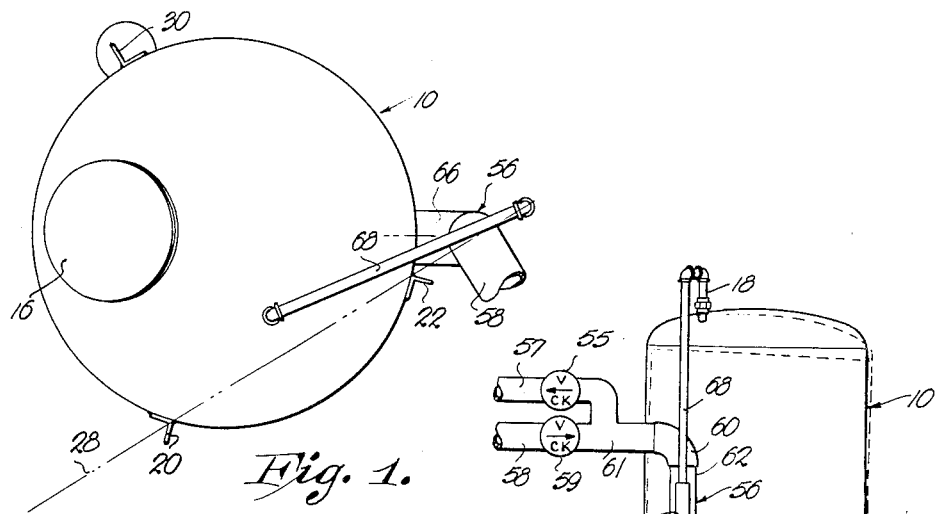
Fig. 1.
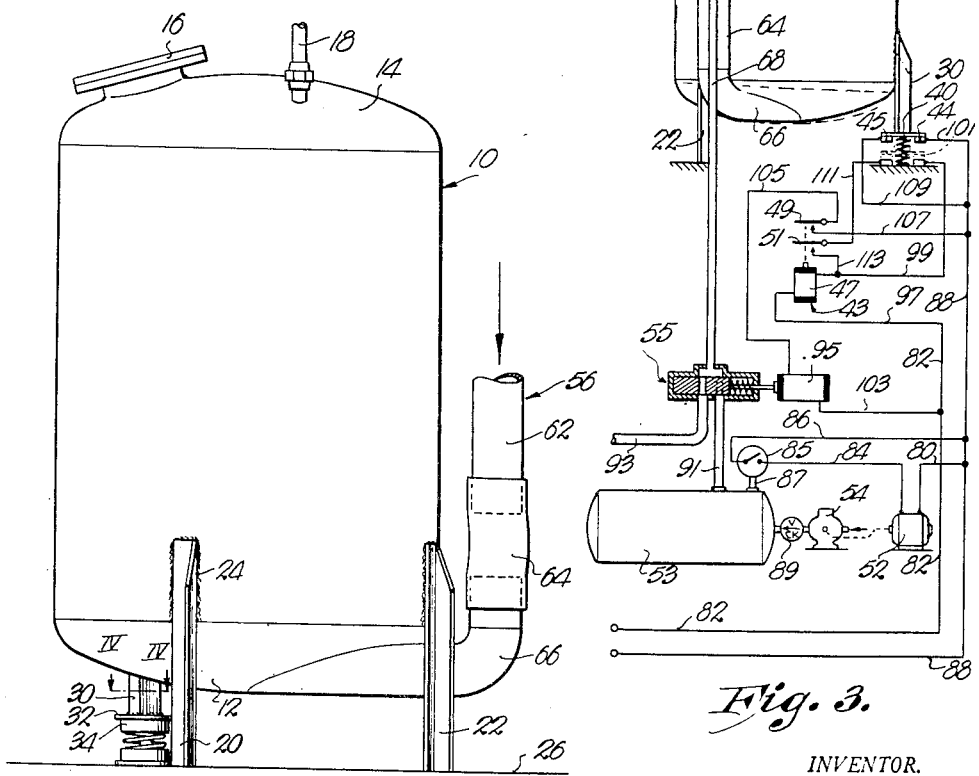
Fig. 2.
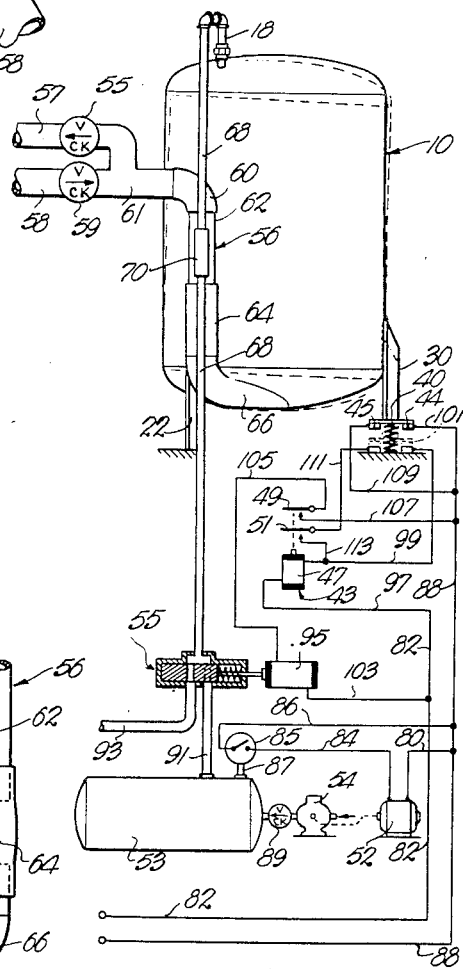
Fig. 3.
INVENTOR.
Frank G. Weis
BY 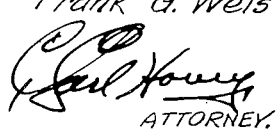
ATTORNEY.

Jan. 29, 1957  F. G. WEIS  2,779,562
WEIGHING TANK SWITCH CONTROL SYSTEM
Filed Aug. 29, 1955  2 Sheets-Sheet 2

INVENTOR.
Frank G. Weis
BY
ATTORNEY.

United States Patent Office 2,779,562
Patented Jan. 29, 1957

2,779,562

WEIGHING TANK SWITCH CONTROL SYSTEM

Frank G. Weis, Kansas City, Mo., assignor to Smith and Loveless, Inc., Merriam, Kans., a corporation of Kansas Application August 29, 1955, Serial No. 531,168

6 Claims. (Cl. 249—1)

This invention relates to the control of flow in a liquid system and, more particularly, to weighing tank apparatus having switching means associated therewith for controlling the operation of electrically responsive means adapted for emptying liquid from the tank. Although the invention is not necessarily so limited, it has particular utility in connection with sewage ejector systems.

Prior devices intended for the same general purpose and often referred to as pneumatic sewage ejectors have all been subject to one or more marked disadvantages. Some of such prior devices have used electrodes or float switches to control the supplying of air used for ejection of sewage from a tank. Such arrangements are subject to fouling by the sewage and also to leakage through the stuffing boxes. Similarly, the only known prior suggestions of so-called weighing tank type controls have been unsatisfactory for use in the applications here contemplated. Some have involved and required careful balancing of a tank upon what amounts to a scale arm. Such systems are obviously both expensive to manufacture and difficult to maintain in adjustment for proper operation. Others have been still more complex to the point of being entirely impractical from the economic viewpoint. Still others have involved mechanisms of a type embodying limitations upon the capacity of the tank which may be used.

Accordingly, it is the primary object of this invention to provide an improved pneumatic sewage ejector, including weighing tank apparatus therefor, overcoming all of the above-noted and other objections to devices of the same general class heretofore known.

It is another important object of this invention to provide such apparatus which may be of practically any size for accommodating any quantity of liquid within the weighing tank portion of the system.

Another important object of the invention is to provide a weighing tank pneumatic sewage ejection system in which the tank is adapted to rest or be supported upon three leg assemblies carried by a floor or the like.

Another important object of this invention is to provide adjustable structure for varying the weight of liquid responsive to which the tank will positively open or close an electrical switch.

Another important object of the invention is to provide, in combination, a weighing tank adapted to close a switch for energizing a valve or a motor coupled with a compressor or pump which is in turn coupled with the tank for emptying the latter whenever the liquid reaches a predetermined level in the tank resulting in the closure of such switch, thereby presenting an automatically operable storage facility adapted for maintaining itself filled to a predetermined level.

Still other important objects of the invention, including certain significant details of construction, will be made clear or become apparent as the following description of the invention progresses.

In the accompanying drawings:

Fig. 1 is a top plan view of one embodiment of weighing tank such as contemplated by this invention showing certain connections thereto;

Fig. 2 is a side elevational view of the weighing tank shown in Fig. 1;

Fig. 3 is an essentially diagrammatic view of the entire system contemplated by the invention;

Figure 4:
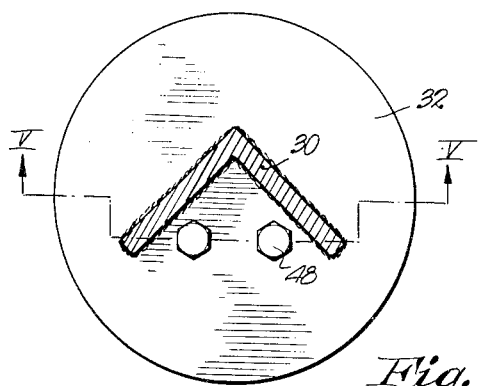
Fig. 4 is a cross-sectional view of the leg assembly of the tank associated with the switch mechanism taken on line 4—4 of Fig. 2.
Figure 5:
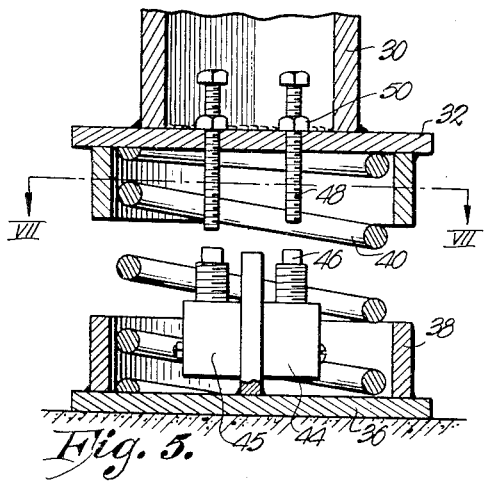
Fig. 5 is a cross-sectional view taken on irregular line 5—5 of Fig. 4.
Figure 6:
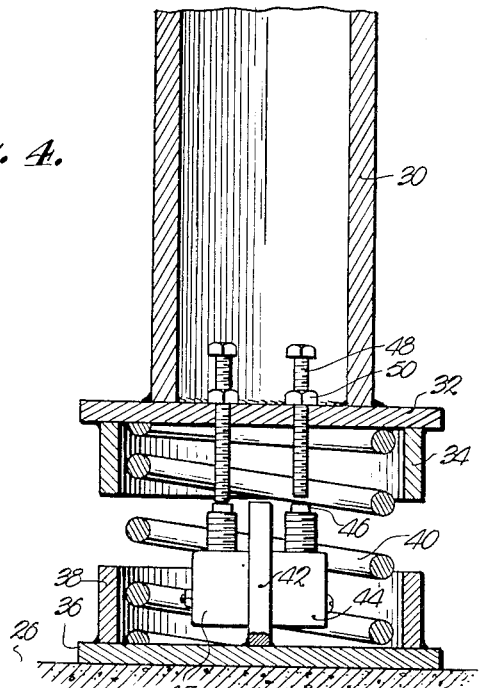
Fig. 6 is a cross-sectional view similar to that of Fig. 5 but showing the leg assembly in position for operating the switching mechanism.
Figure 7:
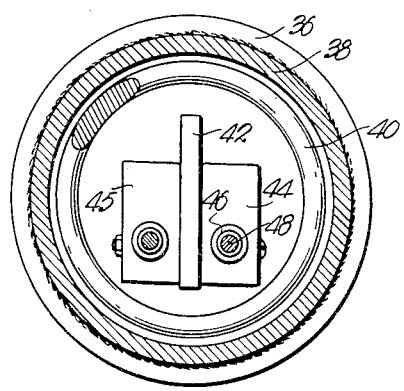
Fig. 7 is a cross-sectional view taken on line 7—7 of Fig. 5.

Referring now to the drawings, the numeral 10 generally designates a generally cylindrical, upright tank having a closed bottom 12 and a closed top 14 provided with a conventional access hatch 16. An air inlet pipe 18 extends downwardly through top 14 into communication with the interior of the tank 10.

A pair of elongated leg assemblies 20 and 22, which may be in the nature of angle irons, are secured to tank 10 adjacent the lower extremity thereof in spaced relation to each other as by welding 24. The lowermost ends of legs 20 and 22 are adapted to rest upon or be otherwise secured to a floor 26 in a manner permitting pivotal movement of the legs 20 and 22 relative to the floor 26 about an axis through the lowermost ends of said legs, said axis being indicated in Fig. 1 by the dotted line designated 28.

A third, shorter leg assembly 30 is secured to the opposite side of tank 10 by welding or the like and is provided with a plate 32 on the lowermost end thereof. Depending from plate 32 is a tubular collar 34 axially aligned with the center of leg 30. Underlying the plate 32 in spaced relationship thereto and in resting engagement upon floor 26 is a base plate 36 having an upstanding, axially aligned collar 38 thereon.

Disposed between plates 32 and 36 and confined by collars 34 and 38 is a coil spring 40 of predetermined tension having a predetermined resistance to compression, said spring 40 serving to yieldably bias the plate 32 upwardly and away from the plate 36.

An upstanding bracket 42 mounted on plate 36 carries a pair of electrical switching devices 44 and 45 each having a plunger 46 for operating the switch 44 (or 45) when the corresponding plunger 46 is reciprocated. Threaded into the plate 32 for each switching device 44 and 45 is a bolt 48 provided with a lock nut 50. The bolts 48 are adapted to engage the plungers 46 to operate the switching devices 44 and 45 when the leg assembly 30 is forced downwardly against the biasing action of spring 40 a predetermined distance depending on the adjusted positioning of the bolts 48 relative to plate 32. For reasons hereinafter to be explained, the bolt 48 associated with switch 45 is normally adjusted so that switch 45 will close prior to the closing of switch 44 by its bolt 48 as tank 10 swings upon axis 28 during filling; conversely, switch 44 will open before switch 45 as tank 10 swings in the opposite direction during ejection.

Referring now to Figs. 1, 2 and 3, and particularly the latter, it will be observed that the over-all system includes a motor 52, a compressor 54, an air storage tank 53, a solenoid valve assembly 55 and combination inlet and outlet conduit means for sewage or other liquid coupled with the tank 10 and generally designated 56.

Conduit means 56 includes a liquid carrying inlet pipe 58 adapted for connection to a source of liquid maintained under conditions for flowing by gravity or its own head into the tank 10, and a liquid carrying outlet pipe 57 adapted for connection with external conduit means (not shown) to which sewage or other liquid from tank 10 is to be delivered. Conduit 58 is connected through a check valve 59 with a T-coupler 61. Conduit 57 is connected with T-coupler 61 through a check valve 55. T-coupler 61 is connected through a flexible L-coupling element 60 with an intermediate upright pipe 62 in turn connected through a flexible straight coupling 64 with a combination inlet-outlet port extension 66 formed as a part of tank 10 extending laterally therefrom and communicating with the interior of the latter through the bottom 12 thereof.

It is extremely significant, particularly with regard to the flexible coupling 64, that such coupling 64, the pipe 62 and the right angle bend portions of port extension 66 and coupling 60 against which liquid material flowing through the conduit means 56 is vertically imposed are all disposed along a vertical plane through the line of axis of pivot 28. For this reason, the entry (or discharge) of liquid material through the conduit means 56 is in a direction exerting a force directly downwardly (or upwardly) upon the legs 20 and 22 toward (or away from) their axis of pivot rather than in a direction tending to cause pivotal movement of the tank by virtue of the flow of liquid itself. Similarly, the provision of the flexible couplings 60 and 64 substantially eliminates any restraint upon the tilting of the tank 10 relative to the axis of pivot 28 which might otherwise be caused by the connection between the tank 10 and the conduit means 56.

In like manner the upper end of air inlet pipe 18 is coupled through conduit means 68 having a flexible coupling 70 therein with solenoid valve 55.

The compressor 54 is mechanically coupled as indicated at 78 with the electric motor 52 for operation of the compressor 54 whenever the motor 52 is energized. The motor 52 has one terminal thereof electrically coupled by a conductor 80 with one line 82 of an electrical power main, while the other terminal of motor 52 is coupled by a conductor 84 with one side of a normally open, pressure-responsive switch 85, the other side of switch 85 being connected through a conductor 86 with the other line 88 of the power main. Switch 85 is pneumatically coupled with air storage tank 53 by conduit means 87.

Compressor 54 is pneumatically coupled through a check valve 89 with air storage tank 53, the latter being in turn coupled with solenoid valve 55 through conduit means 91. Valve 55, besides its connections with conduits 68 and 91, is provided with a vent port 93 in communication with the atmosphere. Solenoid valve 55 is provided with an operating coil 95; and valve 55, which may be of conventional character, is so arranged that, when coil 95 is deenergized, conduit 68 is placed in communication with atmospheric port 93, and conduit 91 is closed; while, when coil 95 is energized, conduit 68 is placed in communication with air supply conduit 91, and port 93 is closed.

A relay 43 having a coil 47 and a pair of normally open switches 49 and 51 is provided in the preferred circuitry. Relay coil 47 is coupled in series with control switch 44 and between lines 82 and 88 by conductors 97, 99 and 101. Solenoid valve coil 95 is coupled in series with relay switch 49 and between lines 82 and 88 by conductors 103, 105 and 107. Control switch 45 and relay switch 51 provide a holding circuit for relay coil 47, said switches 45 and 51 being coupled in series between line 88 and coil 47 by conductors 109, 111, 113 and 99.

In Fig. 3 the normal position of the tank 10 is indicated in solid lines, while its filled position in which the weight of liquid within the tank 10 moves the leg 30 to close the switch 44 is shown in dotted lines. The operation of the system is simple and will be understood as involving the following steps:

Assuming that the tank 10 is empty, the spring 40 will bias the leg 30 upwardly to maintain the bolts 48 out of operative engagement with plungers 46 of switching devices 44 and 45 and to maintain the tank 10 in its normal or unweighted position. When the tank 10 is in such condition and the switches 44 and 45 open, valve 55 will be closing conduit 91 and accordingly tank 53 and will be venting tank 10 by coupling conduit 68 with port 93. Obviously, such venting of tank 10 permits the entry thereinto of sewage or other gravity flowing liquid material through conduit 58, check valve 59 and conduit means 56.

Meanwhile, motor 52 operates compressor 54 to maintain the air within supply tank 53 at a predetermined pressure whenever pressure switch 85 closes as a result of the pressure falling below the desired level.

Upon the flow of sufficient liquid through conduit means 56 into the interior of tank 10 to fill the latter to a predetermined level, the weight of such liquid will swing the tank 10 upon the axis of pivot 28 to move the leg 30 downwardly until one of the bolts 48 has operated the corresponding plunger 46 to close the switch 45. Closure of switch 45 readies the holding circuit for relay coil 43 but does not, of itself, energize the latter. As liquid continues to flow into the tank 10, the latter will continue to swing moving leg 30 downwardly until the other bolt 48 has engaged the plunger of switch 44 to close the latter. Closure of switch 44 will cause the energization of the operating circuit for relay coil 47 from power line 82 through conductor 97, coil 47, conductor 99, closed switch 44 and conductor 101 to power line 88. Energization of coil 47 operates relay 43 closing switches 49 and 51. The closing of switch 51 completes the holding circuit for relay coil 47 from line 88 through conductor 109, switch 45, conductor 111, switch 51, conductors 113 and 99, coil 47 and conductor 97 to line 82, whereby coil 47 will be maintained energized and switches 49 and 51 closed until switch 45 has opened, regardless of the prior opening of switch 44 as liquid is ejected from tank 10. The closing of switch 49 energizes solenoid valve coil 95 through the circuit from line 82 through conductor 103, coil 95, conductor 105, switch 49 and conductor 107 to line 88, thereby operating the valve 55 to close vent 93 and supply air under pressure from tank 53 through now interconnected conduits 91 and 68 to tank 10, thereby forcing liquid from tank 10 through conduit means 56 and check valve 55 into conduit 57 until the level of liquid within tank 10 has been restored to a predetermined level having a weight insufficient to maintain the tank 10 swung to a position for closing the switch 45. Adjustment of the bolts 48 permits the weight or level of liquid within tank 10 at which the valve 55 will be operated during each filling and ejection to be adjusted as desired.

After completion of the liquid ejecting portion of the cycle, opening of switch 45 will again restore the valve 55 to condition coupling conduit 68 with vent port 93, so that further liquid may flow by gravity into tank 10.

It will now be apparent that the apparatus contemplated by this invention is ideally suited for the accomplishment of all of the objectives and advantageous results above referred to. It will also be manifest, however, that certain minor modifications and changes might be made from the exact structure shown and described for purposes of illustration without departing from the true spirit and intention of the invention. Accordingly, it is to be understood that the invention shall be deemed limited only by the scope of the appended claims.

Having thus described the invention, what is claimed as new and desired to be secured by Letters Patent is:

1. In a weighing tank system, a liquid receiving tank having an inlet; means coupled with said inlet for introducing liquid into the tank; three tank-supporting legs secured to the tank and depending therefrom, a pair of said legs being pivotally supported on the ground to render the tank swingable about a horizontal axis therebelow;

resilient means between and oppositely engaging the third leg and the ground for yieldably biasing said third leg upwardly; a control device having a shiftable member, said device being adapted for operation when said member is shifted a predetermined distance; and means on said third leg engageable with said member for shifting the latter as the tank swings against the yieldable bias of said resilient means under the influence of liquid introduced into the tank.

2. In a system as set forth in claim 1, wherein said means coupled with said inlet includes a flexible coupling element.

3. In a system as set forth in claim 1, wherein said means coupled with said inlet includes an L-bend portion having a substantially horizontal portion leading directly to and communicating with the tank at the bottom of the latter and a substantially vertical portion through which liquid is adapted to flow toward the horizontal portion, the axis of said vertical portion being disposed substantially in a vertical plane including said axis of swinging movement of the tank.

4. In a pneumatic sewage ejector system, a closed, liquid receiving tank having an air inlet port and a liquid inlet-outlet port; conduit means coupled with said liquid port for carrying liquid to and from the tank, said means including a pair of branches each having a check valve therein, one of said branches being adapted for coupling with a source of liquid sewage material, the other of said branches being adapted for coupling with external conduit structure into which said material is to be ejected, said check valves being disposed for flow of said material from said liquid source into said one branch and from said other branch into said structure; three tank-supporting legs secured to the tank and depending therefrom, a pair of said legs being pivotally supported on the ground to render the tank swingable about a horizontal axis therebelow; resilient means between and oppositely engaging the third leg and the ground for yieldably biasing said third leg upwardly; a source of air under pressure; means including an air control valve coupled with said air port and adapted for alternately placing the latter in communication with said air source and the atmosphere; a control device having a shiftable member, said device being adapted for operation when said member is shifted a predetermined distance; means on said third leg engageable with said member for shifting the latter as the tank swings against the yieldable bias of said resilient means under the influence of liquid introduced into said tank; and means operable coupling said device with said air valve for operating the latter to place the air port in communication with the air source when the device is operated and with the atmosphere when the device is unoperated.

5. In the system as set forth in claim 4, wherein said air source includes a storage tank; a compressor pneumatically coupled with said tank; an electrical motor mechanically coupled with said compressor; and a pressure responsive, electrical switching assembly pneumatically coupled with said tank and electrically coupled with said motor.

6. In the system as set forth in claim 4, wherein said air valve includes an electrical, operating solenoid therefor; said device includes an electrical control switch; and said last-mentioned means includes electrical circuitry coupling said control switch with said operating solenoid.

References Cited in the file of this patent

UNITED STATES PATENTS

| | | |
|---|---|---|
| 1,319,478 | Leinert | Oct. 21, 1919 |
| 2,351,606 | Gold et al. | June 20, 1944 |
| 2,684,826 | Buzas | July 27, 1954 |